M. L. NIX.
PIPE FITTING.
APPLICATION FILED MAR. 13, 1916.
1,226,690.
Patented May 22, 1917.
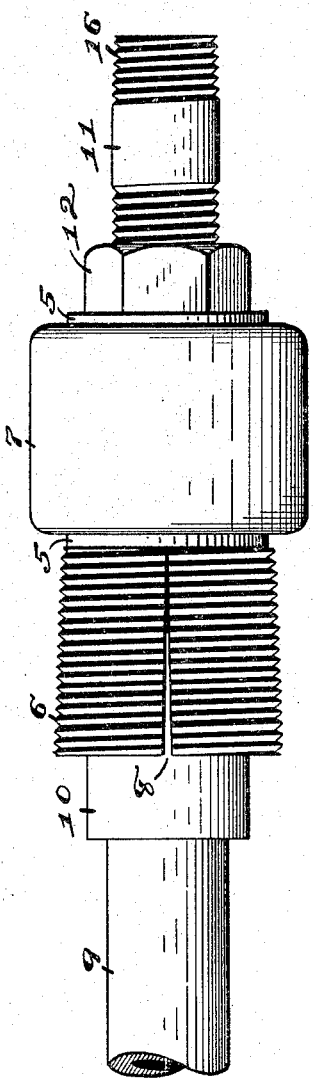
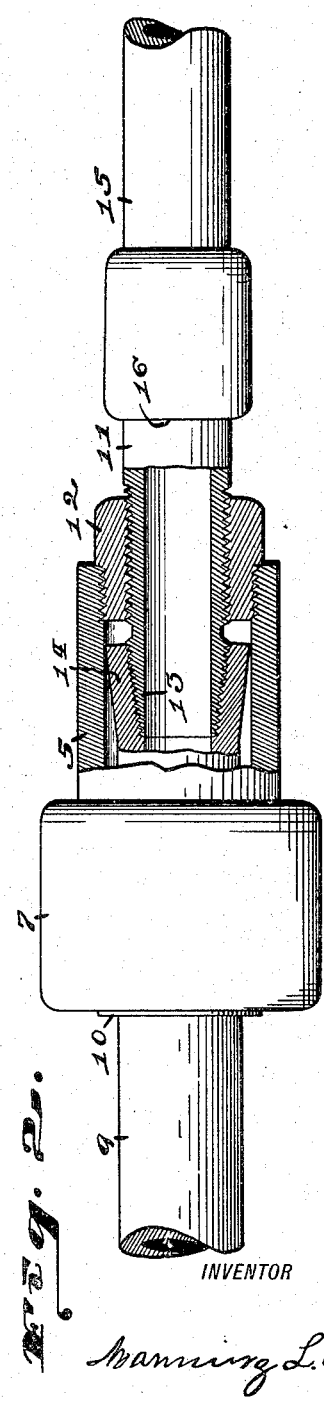
INVENTOR
Manning L. Nix

UNITED STATES PATENT OFFICE.

MANNING L. NIX, OF OKLAHOMA, OKLAHOMA.

PIPE-FITTING.

1,226,690.         Specification of Letters Patent.        Patented May 22, 1917.

Application filed March 13, 1916. Serial No. 83,809.

*To all whom it may concern:*

Be it known that I, MANNING L. NIX, a citizen of the United States, residing at Oklahoma city, in the county of Oklahoma and State of Oklahoma, have invented certain new and useful Improvements in Pipe-Fittings, of which the following is a specification, reference being had to the accompanying drawings.

In making connections of pipe in plumbing, it is often necessary to join iron pipe to lead pipe, and this is usually done by what is known in plumbing as a "wiped" joint.

An object of the invention is to obviate the necessity of making the joint in this way, and provide a joint which may be made with less skill.

Other objects and advantages of the invention will be set forth in the ensuing description.

In carrying out the objects stated, the inventor has designed and constructed the improved joint shown by the accompanying drawings.

Figure 1 is an elevation view showing the improved joint slipped onto the end of a piece of lead pipe and ready to be permanently clamped thereto.

Fig. 2 is a similar view, partly in section, showing the joint attached to the lead pipe and ready to have the iron pipe attached to it.

Like characters of reference designate like parts in both the figures.

The improved joint includes a tubular body 5 which has one of its ends exteriorly screwthreaded, as at 6, and embraced by a threaded nut or sleeve 7; the threaded end of the body being slitted at a number of places, as at 8, so that it may be spread open like the jaws of a chuck.

Fig. 1 shows the nut or sleeve 7 unscrewed from the threaded end of the body 5, and shows a section of lead pipe 9 inserted in said body; a lead sleeve or bush 10 which embraces said pipe 9 being shown slipped partly into place in the slitted end of said body.

Fig. 2 shows the sleeve 10 slipped entirely into place and shows the nut or sleeve 7 screwed to place to clamp the slitted end of the body 5 to the sleeve 10 and clamp said sleeve firmly to the lead pipe 9.

In this way the body 5 is mounted tightly on the end of the lead pipe 9, so that a nipple 11 which is screwthreaded through the removable end 12 of the body 5 may have its screwthreaded end 13 forced tightly into the end 14 of said pipe 9.

The nipple 11, in being forced into the end 14 of the lead pipe 9, cuts its own thread therein and, being tapered, forms a watertight union with the pipe 9.

The iron pipe 15 may then be screwed onto the end 16 of the nipple 11, which completes the joining of said pipe to the lead pipe 9 without the trouble and expense required in the wiping process.

Having thus described the invention, I claim:—

1. In a pipe joint, a tubular body portion having one of its ends slitted and adapted to receive a lead pipe, means for closing the slitted end of the body forcibly against the lead pipe, means at the opposite end of the tubular body for forcing a nipple connection into the end of the lead pipe, the nipple connection being adapted to attach to an iron pipe.

2. In a pipe joint, a tubular body portion having one of its ends slitted and adapted to receive a lead pipe, a nut or sleeve screwthreaded to the slitted end of the body portion and adapted to forcibly close it onto the lead pipe, a nipple connection screwthreaded into the opposite end of the body portion whereby it may be forced into the end of the lead pipe held by the slitted end of the body portion, the nipple connection being adapted to be joined to an iron pipe.

3. In a pipe joint, a tubular body portion adapted to be slipped onto the end of a lead pipe, means for clamping the body portion in place on the lead pipe, a nipple connection screwthreaded in the end of the body portion, said nipple connection having a tapered screwthreaded end adapted to be screwed into the end of the lead pipe in the body portion, the nipple connection being adapted to be joined to an iron pipe.

Witness my hand this 7 day of March, 1916.

MANNING L. NIX.

Witnesses:
J. W. BOUSE,
FRANK P. SHEPARD.

Copies of this patent may be obtained for five cents each, by addressing the "Commissioner of Patents, Washington, D. C."